United States Patent
Nielsen

(10) Patent No.: US 7,831,153 B2
(45) Date of Patent: Nov. 9, 2010

(54) OPTICAL WDM TRANSMISSION SYSTEM HAVING A DISTRIBUTED ARRANGEMENT OF REGENERATORS

(75) Inventor: Torben N. Nielsen, Monmouth Beach, NJ (US)

(73) Assignee: Xtera Communications, Inc., Allen, TX (US)

( * ) Notice: Subject to any disclaimer, the term of this patent is extended or adjusted under 35 U.S.C. 154(b) by 380 days.

(21) Appl. No.: 10/831,963

(22) Filed: Apr. 26, 2004

(65) Prior Publication Data

US 2007/0009261 A1    Jan. 11, 2007

Related U.S. Application Data

(63) Continuation of application No. 10/002,605, filed on Nov. 15, 2001, now abandoned.

(51) Int. Cl.
*H04B 10/00* (2006.01)

(52) U.S. Cl. ........................... 398/175; 398/173
(58) Field of Classification Search .......... 398/173–181
See application file for complete search history.

(56) References Cited

U.S. PATENT DOCUMENTS

| | | | |
|---|---|---|---|
| 6,069,719 A * | 5/2000 | Mizrahi | 359/124 |
| 6,108,339 A | 8/2000 | Norman, Jr. | 370/405 |
| 6,198,556 B1 | 3/2001 | Mizrahi | 359/124 |
| 6,256,125 B1 * | 7/2001 | Uehara | 359/124 |
| 6,607,311 B1 | 8/2003 | Fishman et al. | 398/79 |
| 6,631,222 B1 | 10/2003 | Wagener et al. | 385/16 |
| 2007/0003186 A1 | 1/2007 | Wagener et al. | 385/17 |

OTHER PUBLICATIONS

"Synchronous Optical Network (SONET) Transport Systems: Common Generic Criteria," Telcordia Technologies GR-253-CORE, Issue 3, Sep. 2000.

* cited by examiner

*Primary Examiner*—Agustin Bello
(74) *Attorney, Agent, or Firm*—Workman Nydegger

(57) ABSTRACT

A network node is provided for use in a WDM optical transmission system that includes a plurality of network nodes interconnected by communication links. The network node includes an optical switch having at least one input port for receiving from the transmission system a WDM signal having a plurality of wavelength components. The network node also includes a regenerator arrangement having sufficient regeneration capacity to regenerate a prescribed fraction of the plurality of wavelength components. The prescribed fraction is less than a maximum number of wavelength components that may be received by the node. A network management element is provided so that the network node can for communicate with a network management center in the transmission system.

44 Claims, 6 Drawing Sheets

TRANSFORMING UI INTO REGENERATOR/WAVELENGTH CONVERTER BY MANUALLY PLACING FIBER JUMPERS BETWEEN TRANSMIT RECEIVE PAIRS ON SHORT-REACH INTERFACE SIDE OF UI

IMPLEMENTATION OF DISTRIBUTED REGENERATION USING IDLE USER-INTERFACES HAVING DWDM TRANSMITTERS AND RECEIVERS

TRANSFORMING UI INTO REGENERATOR/WAVELENGTH
CONVERTER BY MANUALLY PLACING FIBER JUMPERS
BETWEEN TRANSMIT RECEIVE PAIRS ON
SHORT-REACH INTERFACE SIDE OF UI

OPTICAL CROSS-CONNECT WITH DISTRIBUTED
REGENERATION/WAVELENGTH CONVERSION

OPTICAL WDM TRANSMISSION SYSTEM HAVING A DISTRIBUTED ARRANGEMENT OF REGENERATORS

STATEMENT OF RELATED APPLICATION

This application is a continuation and claims the benefit of priority of U.S. patent application Ser. No. 10/002,605, filed Nov. 15, 2001 now abandoned, entitled "Optical WDM Transmission System Having A Distributed Arrangement of Regenerators," which is herein incorporated by reference.

FIELD OF THE INVENTION

The present invention relates generally to optical WDM transmission systems, and more particularly to an optical WDM transmission system that employs regenerators that are distributed throughout the network.

BACKGROUND OF THE INVENTION

Wavelength division multiplexing (WDM) is one technique used to increase the capacity of optical transmission systems. A wavelength division multiplexed optical transmission system employs plural optical channels, each channel being assigned a particular channel wavelength. In a WDM system, optical channels are generated, multiplexed to form an optical signal comprised of the individual optical channels, transmitted over a waveguide, and demultiplexed such that each channel wavelength is individually routed to a designated receiver. Through the use of optical amplifiers, such as doped fiber amplifiers, plural optical channels are directly amplified simultaneously, facilitating the use of wavelength division multiplexing in long-distance optical systems. Some WDM systems currently under development will have thirty or more closely spaced channels separated by a spacing on the order of 0.5 to 5 nm and are referred to as Dense Wavelength Division Multiplexing (DWDM) systems. In connection with the present invention, the terms WDM and DWDM will often be used interchangeably herein.

WDM systems have been deployed in long distance networks in a point-to-point configuration consisting of end terminals spaced from each other by one or more segments of optical fiber. In metropolitan areas, however, WDM systems having a ring or loop configuration are currently being developed. Such systems typically include a plurality of nodes located along the ring. At least one optical add/drop element, associated with each node, is typically connected to the ring with optical connectors. The optical add/drop element permits both addition and extraction of channels to and from the ring. A particular node that allows the addition and extraction of all the channels is commonly referred to as a hub or central office node, and typically has a plurality of associated add/drop elements for transmitting and receiving a corresponding plurality of channels to/from other nodes along the ring.

Optical signals in WDM networks experience degradations (i.e., degradations in the optical signal-to-noise ratio) due to ASE (Amplified Spontaneous Emission) accumulation as well as effects such as PMD (polarization Mode Dispersion), PDL (Polarization Dependent Loss), dispersion and fiber non-linearities, which arise as the signals propagate through the optical network. As a consequence, optical signals sometimes require regeneration so that they can be transmitted over extended distances. The regeneration can involve processes in the optical domain, such as optical amplification, dispersion compensation and PMD compensation. The regeneration can also involve additional processes. In addition to these optical processes, regeneration can also involve re-shaping and re-timing of individual wavelength channels, which typically is achieved by converting the wavelength channel into the electrical domain, and back into the optical domain. In addition to regenerating the signal, a regenerator can also perform wavelength conversion so that the output signal of the regenerator is emitted at a wavelength different from the wavelength of the input signal. Regenerators incorporating wavelength conversion not only extend the distance a signal can propagate in the network, but also serve to avoid wavelength contention, thereby increasing the effective capacity of the network. In a conventional arrangement regeneration is accomplished by converting the wavelength channels into the electrical domain and back into the optical domain (a so-called opto-electronic conversion). Regeneration can also be accomplished by all optical means (a so-called all-optical regeneration), although this is not widely used in today's network.

In current networks regeneration is performed at preselected nodes. For example, in a network having a ring topology regeneration is typically performed at hub-nodes that inter-connect individual rings. The hub-nodes typically regenerate each and every one of the wavelength channels, regardless of whether the channels actually require regeneration or not. That is, the hub-node contains a regenerator for each and every wavelength employed in the network. Accordingly, the hub-node must include more regenerators than are absolutely necessary to regenerate only those channels in need of regeneration. For example, if a particular wavelength channel originates at a node close to the hub-node, it is unlikely to require regeneration as it traverses the hub-node. Nevertheless, the channel would undergo regeneration in the hub-node, thus leading to higher than necessary overall network costs.

It should be noted that the previously mentioned considerations are applicable to a ring network having a static traffic pattern. In the more general case of a ring network having a non-static traffic pattern, each node should be equipped with a regenerator for all wavelength channels entering that node, further increasing overall network costs. Moreover, these considerations are equally applicable to other network topologies such as a mesh topology. In contrast to a ring topology, the channels in a mesh network can take any path from its origination node to its destination node. As a result, like in a ring network with non-static traffic patterns, all nodes must be able to regenerate each and every wavelength employed in the network to ensure that they can all be transmitted successfully from any origination node to any destination node. It is very cost ineffective to make all nodes in a network capable of regenerating all traffic passing through that node.

Accordingly, it would be advantageous if the number of regenerators employed in an optical transmission system could be reduced while still ensuring the successful transmission of all wavelength channels in the network.

SUMMARY OF THE INVENTION

In accordance with the present invention, a network node is provided for use in a WDM optical transmission system that includes a plurality of network nodes interconnected by communication links. The network node includes an optical switch having at least one input port for receiving from the transmission system a WDM signal having a plurality of wavelength components. The network node also includes a regenerator arrangement having sufficient regeneration capacity to regenerate a prescribed fraction of the plurality of wavelength components. The prescribed fraction is less than a maximum number of wavelength components that may be received by the node. A network management element is provided so that the network node can for communicate with a network management center in the transmission system.

In accordance with one aspect of the invention, the regenerator arrangement includes at least one user interface coupled to a local port of the optical switch for conveying traffic between the transmission system and a source of traffic external to the transmission system.

In accordance with another aspect of the invention, the regenerator arrangement may be configured to perform 3R regeneration, 2R regeneration, or 1R regeneration. The regenerator arrangement may also be configured to perform regeneration and wavelength conversion.

In accordance with yet another aspect of the invention, the user interface includes at least one transmitter/receiver interface for communicating with the external source of traffic and for performing regeneration when otherwise in an idle mode of operation.

In accordance with another aspect of the invention, the regenerator arrangement may include at least one dedicated regenerator that is coupled to a local port of the optical switch. This dedicated regenerator may not convey traffic between any sources of traffic external to the transmission system. The dedicated regenerator is connected to dedicated ports on the optical switch, and can be an integral part of the optical switch module.

In accordance with another aspect of the invention, a method is provided for regenerating at least one wavelength component of a WDM optical signal. The method begins by receiving the optical signal at a network node and determining if one or more of the plurality of wavelength components require regeneration. Those wavelength components requiring regeneration are directed to a regenerator and the remaining ones of the plurality of wavelength components are directed to one or more output ports of the network node without undergoing regeneration. Finally, the wavelength components requiring regeneration are regenerated and then directed to one or more output ports of the optical node.

DETAILED DESCRIPTION

In accordance with the present invention, an optical transmission system is provided in which regeneration is performed in a distributed manner throughout the network rather than at a predefined subset of nodes. Moreover, individual wavelength channels only undergo regeneration on an as-needed basis. This functionality is achieved by providing most or all of the network nodes with sufficient capacity to regenerate some fraction of the traffic passing through each node. This fraction may be a fixed or variable percentage of the total traffic traversing a given node. The nodes only direct those incoming wavelength channels to the regenerator whose quality is sufficiently low to warrant regeneration. Those incoming channels that do not need regeneration traverse the node without regeneration. Accordingly, the total number of regenerators that must be employed throughout the network is reduced in comparison to the aforementioned arrangements in which every node must be capable of regenerating every wavelength channel. It should be noted that as used herein the term regeneration refers to 3-R regeneration (re-amplification, re-shaping, re-timing), which may or may not include wavelength conversion. Also, the invention described herein is also applicable to lesser degrees of regeneration including 2-R (re-amplification and re-shaping) as well as simpler processes including amplification dispersion compensation and PMD compensation The efficiency that can be achieved with the inventive arrangement can be evaluated as follows. Given a network that employs N channels in which each node has N/Q regenerators, the fraction of the total number of channels that can be regenerated by each node is 1/Q. This means that in principle after traversing Q nodes, all the channels could undergo regeneration. Further, assume that the network is engineered so that any channel can be successfully transmitted over Q spans (i.e. through Q nodes) without the need to undergo regeneration. In this case, the wavelength channels could be transmitted over an arbitrary number of nodes (i.e. arbitrary distance) while only requiring N/Q regenerators per node. In contrast, a conventional arrangement typically requires N regenerators per node.

While the present invention may provide distributed regeneration across a network in a variety of different ways, one particular implementation will be illustrated in connection with FIGS. 1-6. As detailed below, this embodiment of the invention is particularly advantageous because it makes use of equipment that is already present in the node to perform the additional functionality of regeneration, thus eliminating the need for dedicated regenerators. In particular, in this embodiment of the invention, idle user interface cards are used as regenerators.

Figure 1:
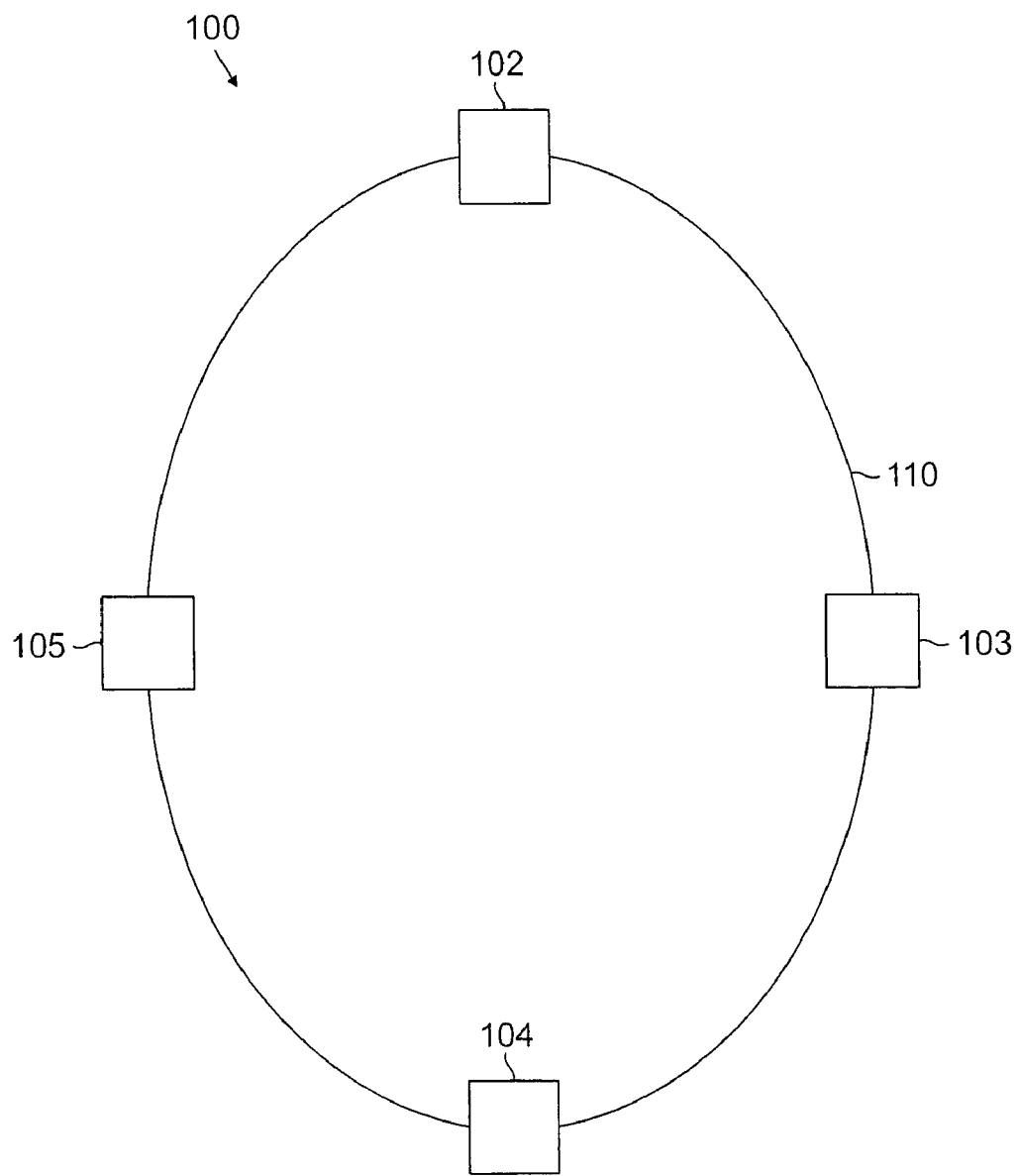
FIG. 1 shows a functional block diagram of a WDM ring network constructed in accordance with the present invention.

FIG. 1 shows a functional block diagram of a WDM ring network 100 in accordance with the present invention. Ring network 100 includes a plurality of nodes 102-105 connected along a continuous, or looped, optical path 110. Each of these nodes is typically linked by a segment of optical fiber.

Figure 2:
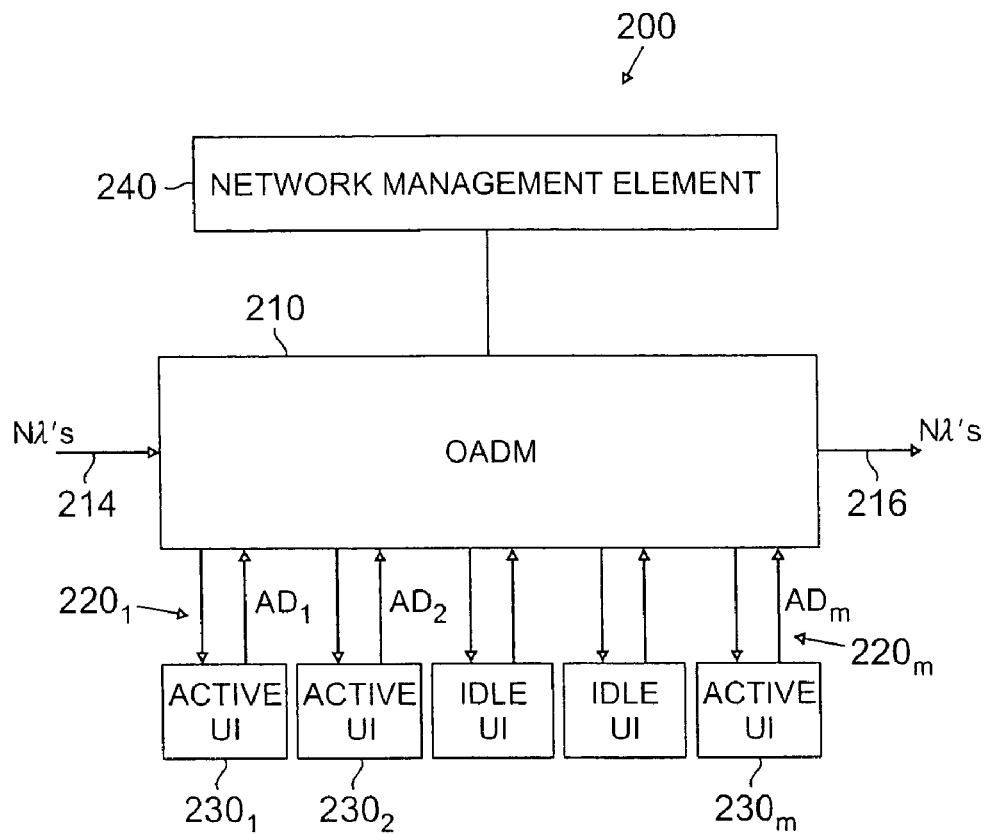
FIG. 2 shows an exemplary one of the nodes of FIG. 1 in more detail.

FIG. 2 shows an exemplary node 200 in more detail. Typically nodes 102-108 have a construction similar to node 200. Node 200 generally includes an optical switch such as an optical crossconnect or an optical add/drop multiplexer (OADM), user interfaces, and a network management element. In the case of node 200 the optical switch is depicted as OADM 210. OADM 210 includes trunk ports 214 and 216, which are connected to optical path 110 for receiving and transmitting the WDM signals traversing the ring network 100. OADM 210 also includes local ports $220_1$, $220_2$, $220_3$, ... $220_m$ that serve as sources and sinks of traffic. Local ports $220_1$, $220_2$, $220_3$, ... $220_m$ are respectively connected to user interfaces $230_1$, $230_2$, $230_3$, ... $230_n$. Each user interface serves as an access point to the ring network 100 for traffic from customer premises. The traffic may be received in a variety of different formats from a variety of different devices such as an Internet router, for example. In addition to providing access, user interfaces $230_1$, $230_2$, $230_3$, ... $230_m$ also groom the traffic so that it can be properly added to the WDM signal traveling on the ring network. Grooming typically involves conditioning and formatting lower-speed traffic streams from the various users into the higher-speed stream that is to be multiplexed with the other traffic on the ring network 100. The traffic streams being groomed initially may be in optical or electrical form. In the former case, grooming involves an optical-electrical conversion of the access traffic, electronic processing followed by electro-optic conversion to a WDM signal. In the latter case the initial optical-electrical conversion of the access traffic may be omitted.

Node 200 also includes network management element 240 for controlling and managing the node. The network management element 240 communicates with a network management center through an out-of-band management network or through one of the wavelengths in the network that is reserved as a supervisory channel.

Figure 3:
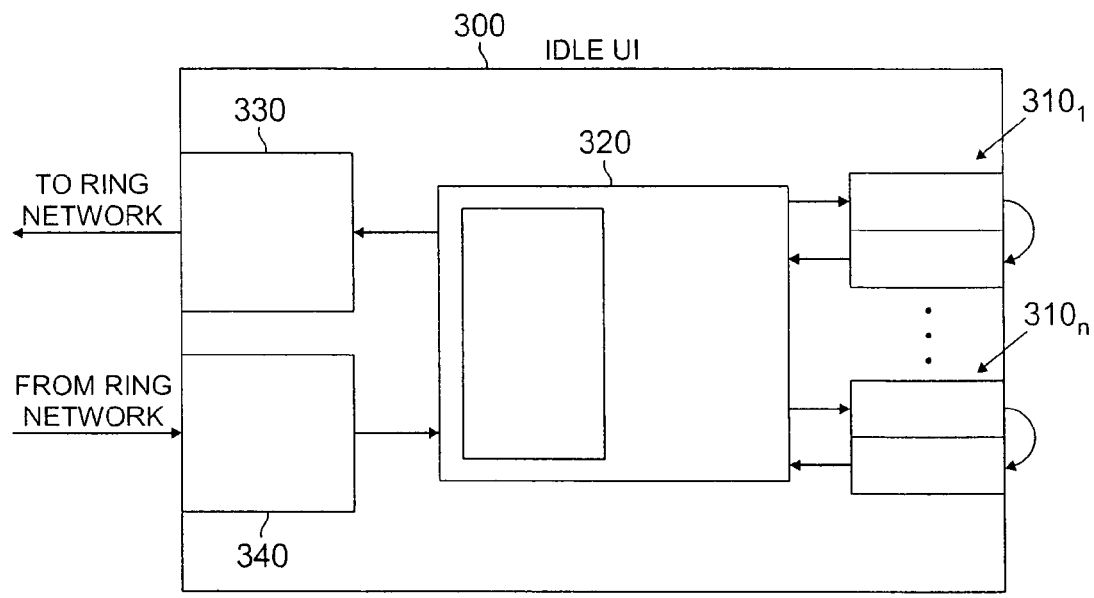
FIG. 3 shows an exemplary user interface that may be employed in the node depicted in FIG. 2.

FIG. 3 shows an exemplary user interface 300 that may be employed in node The user interface 300 includes one or more transmitter/receiver interfaces $310_1$, $310_2$, $310_3$, ... $310_m$, which receive incoming traffic from a customer and forward it to an electronic processing unit 320. The transmitter/receiver interfaces $310_1$, $310_2$, $310_3$, ... $310_m$, are typically short reach interfaces, i.e., optical interfaces that comply with standards established for interfaces between optical equipment by means of low cost (non WDM) optics. These standard interfaces are described in e.g., Telcordia document GR-253, "Synchronous Optical Network (*SONET*) *Transport System: Common Generic Criteria.*" The electronic processing unit 320 includes conventional circuitry to perform synchronization, data aggregation, and signaling for conditioning the incoming and outgoing traffic. The unit 320 may also include circuitry to implement forward error correction techniques in a known manner. A DWDM transmitter 330 and receiver 340 are also provided for directing properly groomed traffic to and from the ring network. The user interfaces may be physically located in shelves or racks associated with the OADM 210.

The present inventor has recognized that a user interface can used to perform the functionality of a regenerator. That is, a wavelength channel dropped from the ring network to the user interface 300 will be received by DWDM receiver 340, converted to an electrical signal and processed by electronic processing unit 320, and forwarded to the short-reach transmitter in interface $310_1$. However, if, instead of transmitting the channel to the user in the conventional manner, the short-reach transmitter conveys the channel to the short-reach receiver in interface $310_1$, over, for example, a simple fiber jumper, the channel will be reshaped and amplified just as it would in a dedicated regenerator, before it is once again multiplexed with the DWDM signal on the ring network. In other words, an idle user interface that at any given time is not being used to transfer traffic between a user and the network 100 may be used as a regenerator if an optical path is provided between the individual transmitter and receivers within a short-reach transmitter/receiver interface. As mentioned, this optical path may be manually provisioned by placing fiber jumpers between the transmitter and receiver of the short-reach transmitter/receiver interface. Alternatively, the optical path may be remotely provisioned by electronic switching components that may be incorporated, for example, into the electronic processing unit 320.

To further illustrate this particular embodiment of the invention, OADM 210 will be assumed to be a reconfigurable optical switch in which any wavelength channels received on trunk ports 214 or 216 can be dropped to any of the local ports $220_1$, $220_2$, $220_3$, ... $220_m$. In contrast, in a static optical switch particular wavelength channels can only be received by predetermined ones of the local ports $220_1$, $220_2$, $220_3$, ... $220_m$. Such reconfigurable optical switches may be electro-optical elements, or, more preferably, all-optical elements. Examples of an all-optical reconfigurable switch are disclosed in U.S. patent application Ser. Nos. 09/571,833 and 09/691,812, which are hereby incorporated by reference in their entirety. It should be noted, however, that while the present invention preferably employs a reconfigurable OADM, a static OADM may be alternatively employed.

Referring again to FIG. 2, assume a WDM signal with wavelength channels $\lambda_1, \lambda_2, \lambda_3, \ldots \lambda_n$ is received on port 214 of OADM 210 and that channels $\lambda_1$ and $\lambda_3$ require regeneration. Further assume that when the WDM signal is received by OADM 210 user interfaces $230_1$ and $230_4$ are currently idle, i.e., not being used by a customer to access the ring network. In this case, since OADM 210 is reconfigurable, OADM 210 may direct channels $\lambda_1$ and $\lambda_3$ to local ports $220_1$ and $220_4$, respectively. In turn, channels $\lambda_1$ and $\lambda_3$ are respectively received by user interfaces $230_1$ and $230_4$ so that they may be regenerated in the previously described manner before being remultiplexed with the WDM signal on ring network. If user interfaces $230_1$ and $230_4$ employ DWDM transmitters that operate at fixed wavelengths of $\lambda_1$ and $\lambda_4$, respectively, then channel $\lambda_3$ undergoes wavelength conversion in addition to being reshaped and reamplified, while channel $\lambda_1$ is regenerated without wavelength conversion. On the hand, if user interfaces $230_1$ and $230_4$ employ tunable DWDM transmitters, channels $\lambda_1$ and $\lambda_3$ may or may not undergo wavelength conversion.

If, as assumed above, OADM 210 is reconfigurable, a given channel can be regenerated by any available idle user interface, thus maximizing the efficient use of idle user interfaces. On the other hand, if OADM is a static device, regeneration of a given channel can only be accomplished when the user interface assigned to that given channel is idle. In the latter case, of course, situations may arise in which a channel requires regeneration and a user interface is available, but nevertheless regeneration cannot be performed. For this reason the present invention preferably employs a reconfigurable OADM or other reconfigurable switch.

Assuming OADM 210 is reconfigurable and that it has M local ports connected to M user interfaces and that I of the user interfaces are available to perform regeneration, then a regeneration capacity of I/N can be achieved while still maintaining a maximum drop capacity of 1−I/N (for M=N).

To determine if a wavelength channel needs to be regenerated upon entering a node, network management element 240 may be used. This determination may be made in a variety of different ways. For example, a centralized approach may be employed in which the channels to be regenerated are determined in accordance with the traffic pattern across the entire network. Alternatively, a de-centralized approach may be employed in which each wavelength channel entering a node is monitored and those channels most in need of regeneration are directed to a regenerator. In some cases the former alternative is preferable because it makes the most efficient overall use of the regenerators in the network.

Figure 4:
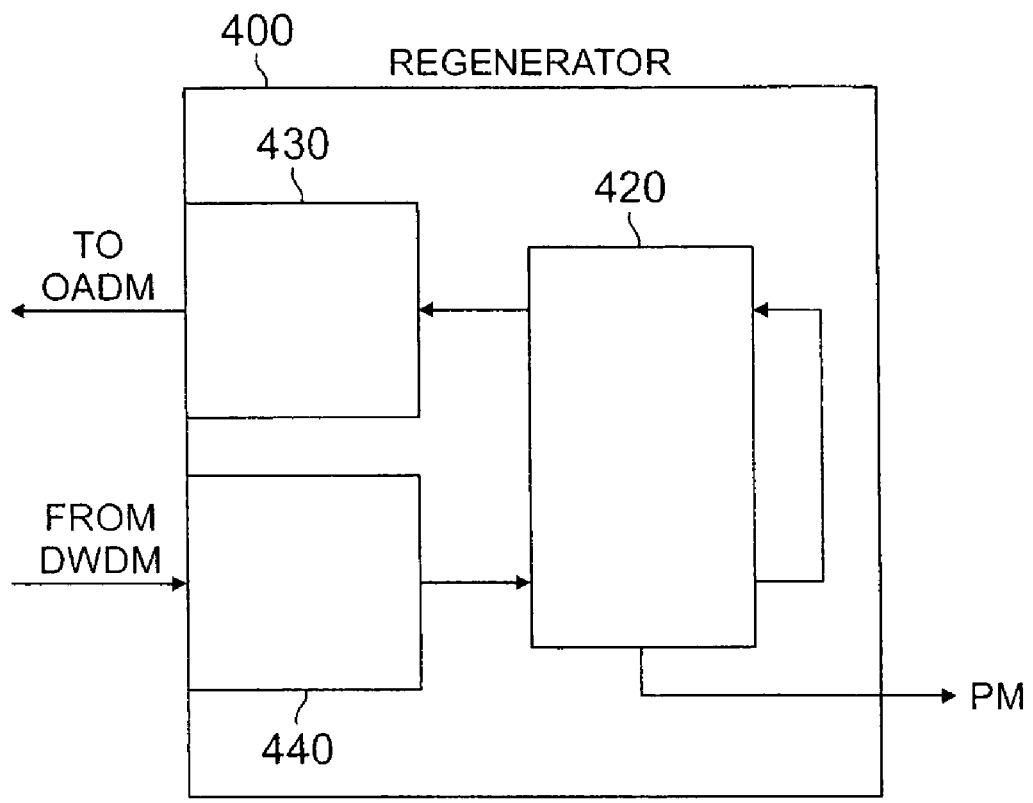
FIG. 4 shows an example of a dedicated regenerator that may be employed in the node depicted in FIG. 2.

As previously mentioned, the present invention is not limited to an arrangement in which regeneration is distributed across the network by means of an idle user interface. For example, in another embodiment of the invention, one or more dedicated regenerators may be connected to one or more local ports of the OADM 210. An example of such a dedicated regenerator is shown in FIG. 4. This regenerator 400 resembles the user interface 300 shown in FIG. 3 except that it eliminates the short-reach transmitter/receiver interface. The regenerator 420 may simply bridge the electrical signal from WDM receiver 440 to WDM transmitter 430. The regenerator 400 may also include a FEC (Forward Error Correction) transceiver unit 420 that corrects bit errors on the received WDM signal before re-transmitting the signal via WDM transmitter 430. Such a unit would, in addition to 3-R regeneration, provide error correction. FEC transceivers usually also provide error count statistics, which means that the regenerator unit 400 may provide performance monitoring of the received WDM signal. The dedicated regenerator 400 depicted in FIG. 4 may be connected to a local port of the OADM 210 on which channels are added or dropped. Alternatively, the OADM 210 may be provided with additional ports for the dedicated regenerators so that the maximum drop capacity of the node is not reduced.

The regenerators employed in the present invention may impart any degree of regeneration to the wavelength channels. That is, the regeneration process may include re-amplification re-shaping and re-timing (so-called 3R regeneration). Alternatively, the regeneration process may include re-amplification and re-shaping without re-timing (so-called 2R regeneration), or even regeneration without either re-shaping or re-timing (so-called 1R regeneration).

Figure 5:
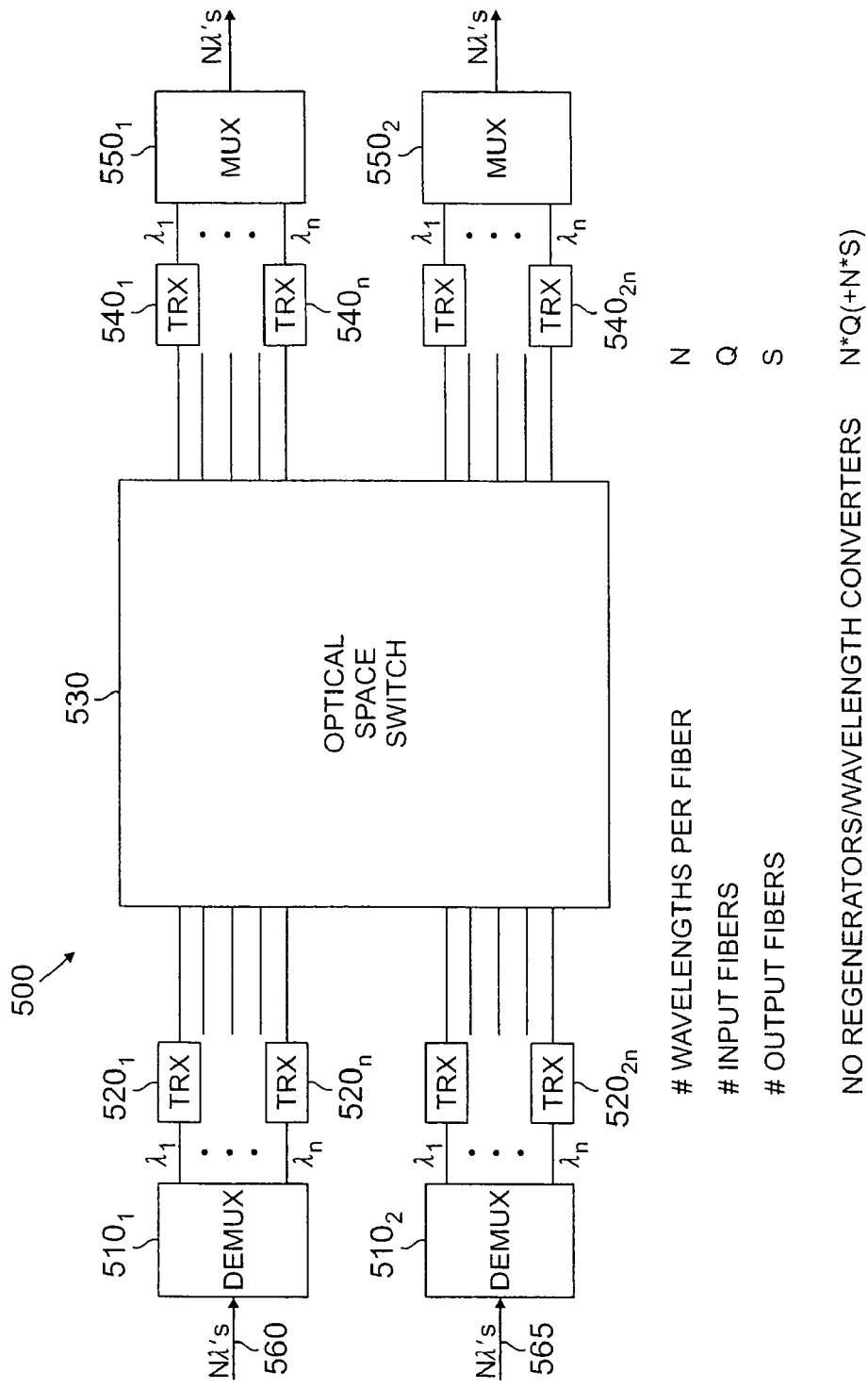
FIG. 5 shows an example of a conventional optical crossconnect.

The present invention is not limited to distributing regeneration across a network of nodes that incorporate OADMs, but rather is equally applicable to a network of nodes that employ any type of switching fabric. For example, the network nodes may incorporate optical cross-connects (OXCs). OXCs, which are more flexible devices than OADMs, can redistribute in virtually any arrangement the components of multiple WDM input signals onto any number of output paths. An example of an OXC is shown in FIG. 5. OXC 500 includes demultiplexers 510, transceivers 520 and 540, a optical space switch 530, and multiplexers 550. WDM signals are received on two or more input fibers 560 and 565, each of which is connected to a demultiplexer $510_1$ and $510_2$ that demultiplex the individual wavelength channels from the WDM signals traveling on the input fibers 560 and 565. Each channel is directed to a transceiver $520_1, 520_2, 520_3 \ldots 5202_n$, which effectively serves to regenerate the channels and which may also perform wavelength conversion. The transceivers are required to compensate for the relatively high insertion loss that arises because the optical signals must pass through three discrete components. Wavelength conversion may be required to avoid wavelength congestion that could arise at the output of the optical space switch 530.

Figure 6:
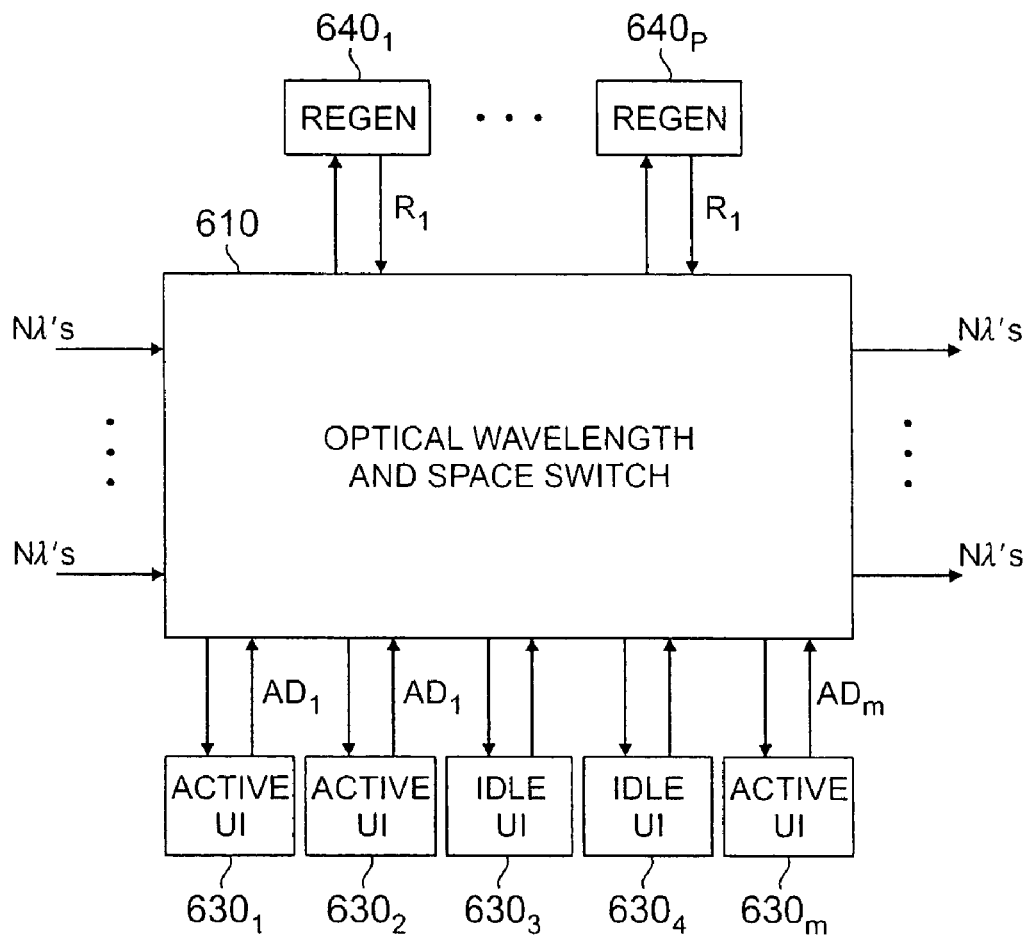
FIG. 6 shows an alternative embodiment of the present invention in which a reconfigurable optical switch is employed to perform the functionality of an optical crossconnect.

A problem with the OXC 500 is that on its input side it uses a transceiver for each demultiplexed channel, thus effectively performing regeneration on each and every wavelength channel, whether or not regeneration is required. Moreover OXC 500 performs an OEO conversion of all the wavelength channels that pass through it. The present invention may overcome these limitations of a conventional OXC with an arrangement such as shown in FIG. 6, which employs an optical switch 610 such as the reconfigurable optical switches disclosed in the aforementioned U.S. patent application Ser. Nos. 09/571,833 and 09/691,812. Once again, regeneration can be performed by idle ones of the user interfaces $630_1, 630_2, \ldots 630_m$ and/or dedicated regenerators $640_1, 640_2, 640_3, \ldots 640_p$ that are connected to additional ports of the optical switch 610. Accordingly, regeneration is performed only on an as-needed basis when the channel quality is impaired or when wavelength conversion is required. For full flexibility, where any wavelength on the input fiber can be directed to one of the m regenerators, and the regenerated signals can be emitted at any wavelength, the optical switch must be capable of switching any wavelength to the dedicated regenerator ports $640_1, 640_2, 640_3, \ldots 640_p$. Likewise the switch must be capable of adding any wavelength from the dedicated regenerator ports $640_1, 640_2, 640_3, \ldots 640_p$ to any of the output fibers. Once again, a switch capable of doing so is described in U.S. patent application Ser. Nos. 09/571,833 and 09/691,812.

The invention claimed is:

1. In a WDM optical transmission system that includes a plurality of network nodes interconnected by communication links, a network node, comprising:
    a reconfigurable optical switch having at least one input port for receiving from the transmission system a WDM signal having a plurality of wavelength components, said reconfigurable optical switch having a plurality of local ports such that any of the wavelengths components received on said at least one input port can be directed to any selected one of the local ports;
    a regenerator arrangement coupled to at least one of the local ports and having sufficient regeneration capacity to regenerate a prescribed fraction of the plurality of wavelength components, said prescribed fraction being less than a maximum number of wavelength components receivable by said node, wherein said regenerator arrangement comprises a plurality of user interfaces for performing regeneration, each of said user interfaces being coupled to a local port of the optical switch for conveying traffic between the transmission system and a source of traffic external to the transmission system such that each of said user interfaces defines an access point to the transmission system for traffic received from the external traffic source;
    a network management element for communicating with a network management center in the transmission system.

2. The network node of claim 1 wherein said prescribed fraction of the plurality of wavelength components is a fixed percentage of said maximum number of wavelength components receivable by said node.

3. The network node of claim 1 wherein said prescribed fraction of the plurality of wavelength components is a variable percentage of said maximum number of wavelength components receivable by said node.

4. The network node of claim 1 wherein said regenerator arrangement is configured to perform 3R regeneration.

5. The network node of claim 1 wherein said regenerator arrangement is configured to perform 2R regeneration.

6. The network node of claim 1 wherein said regenerator arrangement is configured to perform 1R regeneration.

7. The network node of claim 1 wherein said regenerator arrangement is configured to perform regeneration and wavelength conversion.

8. The network node of claim 1 wherein said regenerator arrangement is configured to perform regeneration without wavelength conversion.

9. The network node of claim 1 wherein said regenerator arrangement is configured to perform amplification dispersion compensation.

10. The network node of claim 1 wherein said regenerator arrangement is configured to perform PMD compensation.

11. The network node of claim 1 wherein each of said user interfaces includes at least one transmitter/receiver interface for communicating with the external source of traffic and for performing regeneration when otherwise in an idle mode of operation.

12. The network node of claim 11 wherein said transmitter/receiver interface is a short-reach transmitter/receiver interface.

13. The network node of claim 1 wherein said optical switch is a reconfigurable optical switch.

14. The network node of claim 1 wherein said regenerator arrangement comprises at least one dedicated regenerator coupled to a local port of the optical switch.

15. A method of regenerating at least one wavelength component of a WDM optical signal;
receiving the optical signal at a network node;
determining if one or more of the plurality of wavelength components require regeneration;
directing said one or more of the plurality of wavelength components requiring regeneration to any one or more of a plurality of regenerators and directing remaining ones of the plurality of wavelength components to one or more output ports of the network node without undergoing regeneration, wherein said plurality of regenerators includes a plurality of user interfaces for conveying traffic between the transmission system and a source of traffic external to the transmission system such that each of said user interfaces defines an access point to the transmission system for traffic received from the external traffic source, said one or more of the plurality of regenerators to which the one or more plurality of wavelength components are directed being in an idle mode of operation; and
regenerating said one or more of the plurality of wavelength components requiring regeneration and directing same to one or more output ports of the optical node.

16. The method of claim 15 wherein said optical node includes an optical switch having a plurality of local ports and a plurality of user interfaces respectively coupled to the local ports, and wherein the step of directing said one or more of the plurality of wavelength components requiring regeneration to a regenerator includes the step of directing said one or more of the plurality of wavelength components requiring regeneration to one of the plurality of user interfaces, said one user interface being operationally idle when performing the step of regeneration.

17. The method of claim 15 wherein the regenerating step includes the step of performing 3R regeneration.

18. The method of claim 15 wherein the regenerating step includes the step of performing 2R regeneration.

19. The method of claim 15 wherein the regenerating step includes the step of performing 1R regeneration.

20. The method of claim 15 further comprising the step of performing wavelength conversion on wavelength components undergoing regeneration.

21. The method of claim 15 further comprising the step of performing amplification dispersion compensation.

22. The method of claim 15 further comprising the step of performing PMD compensation.

23. The method of claim 15 wherein each of said user interfaces includes at least one transmitter/receiver interface for communicating with the external source of traffic and for performing regeneration when otherwise in an idle mode of operation.

24. The method of claim 23 wherein said transmitter/receiver interface is a short-reach transmitter/receiver interface.

25. The method of claim 15 wherein said regenerator comprises at least one dedicated regenerator.

26. The method of claim 16 further comprising the step of performing wavelength conversion on wavelength components undergoing regeneration in an idle user interface assigned a wavelength different from said wavelength components.

27. The method of claim 15 wherein the step of determining if one or more of the plurality of wavelengths require regeneration is based on network-wide traffic patterns.

28. The method of claim 15 wherein the step of determining if one or more of the plurality of wavelengths require regeneration includes the step of monitoring each wavelength component received at the network node to assess their need for regeneration and the regenerating step includes the step of regenerating a prescribed number of wavelengths most in need of regeneration.

29. A WDM optical transmission system, comprising:
a plurality of network nodes;
at least one optical communication link interconnecting said network nodes, each of said a network nodes including:
a reconfigurable optical switch having at least one input port for receiving from the transmission system a WDM signal having a plurality of wavelength components, said reconfigurable optical switch having a plurality of local ports such that any of the wavelengths components received on said at least one input port can be directed to any selected one of the local ports;
a regenerator arrangement having sufficient regeneration capacity to regenerate a prescribed fraction of the plurality of wavelength components, said prescribed fraction being less than a maximum number of wavelength components receivable by said node, wherein said regenerator arrangement comprises a plurality of user interfaces each being coupled to a local port of the optical switch for conveying traffic between the transmission system and a source of traffic external to the transmission system such that each of said user interfaces defines an access point to the transmission system for traffic received from the external traffic source;
a network management element for communicating with a network management center in the transmission system.

30. The transmission system of claim 29 wherein said plurality of network nodes includes N network nodes, where N is an integer greater than or equal to 2, said prescribed fraction of the plurality of wavelength components that can be regenerated being at least equal to 1/Q, where Q is an integer denoting a number of nodes that can be successfully traversed by any of the plurality of wavelength components without regeneration.

31. The transmission system of claim 29 wherein said prescribed fraction of the plurality of wavelength components is a fixed percentage of said maximum number of wavelength components receivable by said node.

32. The transmission system of claim 29 wherein said prescribed fraction of the plurality of wavelength components is a variable percentage of said maximum number of wavelength components receivable by said node.

33. The transmission system of claim 29 wherein said regenerator arrangement is configured to perform 3R regeneration.

34. The transmission system of claim 29 wherein said regenerator arrangement is configured to perform 2R regeneration.

35. The transmission system of claim 29 wherein said regenerator arrangement is configured to perform 1R regeneration.

36. The transmission system of claim 29 wherein said regenerator arrangement is configured to perform regeneration and wavelength conversion.

37. The transmission system of claim 29 wherein said regenerator arrangement is configured to perform regeneration without wavelength conversion.

38. The transmission system of claim 29 wherein said regenerator arrangement is configured to perform amplification dispersion compensation.

39. The transmission system of claim 29 wherein said regenerator arrangement is configured to perform PMD compensation.

40. The transmission system of claim 29 wherein said plurality of user interfaces each includes at least one transmitter/receiver interface for communicating with the external source of traffic and for performing regeneration when otherwise in an idle mode of operation.

41. The transmission system of claim 40 wherein said optical switch is a reconfigurable optical switch.

42. The transmission system of claim 29 wherein said regenerator arrangement comprises at least one dedicated regenerator coupled to a local port of the optical switch.

43. The network node of claim 1 wherein at least one of said user interfaces includes a WDM transmitter and receiver for communicating traffic to and from the transmission system and at least one transmitter/receiver interface for communicating with the external source of traffic and for performing regeneration when otherwise in an idle mode of operation.

44. The network node of claim 43 further comprising a switch for selectively provisioning an optical path between a transmitter portion of the transmitter/receiver interface and a receiver portion of the transmitter/receiver interface when performing regeneration.

\* \* \* \* \*